US000001437H

United States Statutory Invention Registration [19]

[11] Reg. Number: H1437

Spelthann [43] Published: May 2, 1995

[54] GRAFTED COPOLYMERS

[76] Inventor: Heinz H. Spelthann, 54, Route-Du-Creux-De-Boisset, CH-1286 Soral, Geneva, Switzerland

[21] Appl. No.: 205,442

[22] Filed: Mar. 4, 1994

[51] Int. Cl.[6] ..... C08L 27/06; C08G 63/91

[52] U.S. Cl. ..... 525/190; 525/64; 525/185

[58] Field of Search ..... 525/64, 185, 190

[56] References Cited

U.S. PATENT DOCUMENTS 4,489,193 12/1984 Goswami ..... 525/185
4,752,639 6/1988 Haller et al. ..... 525/66
5,254,630 10/1993 Schmidt ..... 525/261

FOREIGN PATENT DOCUMENTS 9013600 11/1990 WIPO ..... 525/185

*Primary Examiner*—Shean Wu

[57] ABSTRACT

Grafted copolymers are disclosed which contain an acrylic acid ester polymer, vinyl chloride and a copolymer containing units of ethylene, carbon monoxide and n-butyl acrylate; and their use in preparing self-supporting films (sheets) and moulded articles.

6 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GRAFTED COPOLYMERS

BACKGROUND OF THE INVENTION

The present invention is directed to grafted copolymers which contain an acrylic acid ester polymer, vinyl chloride and a copolymer containing units of ethylene, carbon monoxide and n-butyl acrylate; and to their use in preparing self-supporting films (sheets) and moulded articles.

More particularly, the present invention relates to a thermoplastic graft copolymer comprising (a) an acrylic acid ester polymer; (b) vinyl chloride; and (c) a copolymer consisting essentially, by weight, of (i) 40–80% ethylene; (ii) 3–30% carbon monoxide; and (iii) 5–60% of n-butyl acrylate; and their aforementioned use in preparing films and moulded articles.

The grafted copolymers of the present invention are useful for producing films and moulded articles demonstrating good tensile properties, hardness and tear resistance. They also possess good low temperature properties, aging, weather and oil resistance, and form smooth surfaces that can be glued and welded. Typical end-uses suitable for the grafted copolymers include automobile dashboard panels and waterproofing liners.

Graft copolymers of vinyl chloride, acrylic acid esters and ethylenevinyl acetate-carbon monoxide are known (cf. EP 0 224 913 B1; U.S. Pat. No. 4,752,639). These graft polymers have desirable performance characteristics, including good tensile strength and elongation at break. It has now been found that certain of these properties, including elongation at break and tear resistance, can be surprisingly improved by particular selection of the copolymer to be grafted with vinyl chloride and acrylic acid ester.

DESCRIPTION OF THE INVENTION

Terms as used herein have the following meanings.

Component (a) of the graft copolymer according to the invention, i.e. acrylic acid ester copolymers, is known in the art. The "acrylic acid esters" of the acrylic acid ester copolymers are preferably alkyl acrylates having 4–18 carbon atoms in the repeating unit. A particularly preferred alkyl acrylate is butyl acrylate.

Component (a) is preferably comprises 20–60% by weight of the graft copolymer, more preferably 30–50%, still more preferably 35–45% by weight.

Component (b) of the graft copolymer according to the invention, i.e. vinyl chloride, preferably comprises 30–70% by weight of the graft copolymer, more preferably 30–50%, still more preferably 35–45% by weight.

Component (c) of the graft copolymer according to the invention is likewise known in the art. It can be represented by the formula (I)

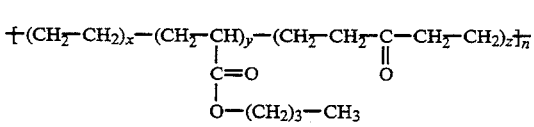

(I)

wherein x, y and z are chosen to provide the percentage ranges of ethylene, carbon monoxide and n-butyl acrylate previously set forth. The copolymer of formula (I) is commonly known as EnBACO, and is available from the DuPont Company under the name ELVALOY HP.

Component (c) preferably comprises 1–30% by weight of the graft copolymer according to the invention, more preferably 10–25%.

The graft copolymers according to the invention can be blended with one or more additional thermoplastic materials to form a thermoplastic composition. The additional thermoplastic material, and the amount to employ in the composition, will be chosen according to the performance characteristics required for the end use of the product produced. Typical additional thermoplastic materials include those which increase the heat distortion resistance such as acrylonitrile/butadiene/styrene copolymer (ABS), styrene/acrylonitrile copolymer (SAN), methylstyrene/acrylonitrile copolymer (MSAN) acrylonitrile/styrene/acrylate copolymer (ASA), styrene/maleic anhydride copolymer (SMA), polyvinylidene fluoride (PVD), methyl methacrylate/butadiene/styrene copolymer (MBS), polymethyl methacrylate (PMMA) and polycarbonate (PC); polymers which lower the Shore hardness such as ethylene/vinyl acetate copolymers and terpolymers (EVAC, VAE); polymers which impart elastomeric properties such as thermoplastic polyurethane (TPU), thermoplastic copolyesters such as HYTREL (available from the DuPont Company), polyether block amide such as PEBAX (available from Elf Atochem), nitrile rubber (NBR), ethylene/propylene/diene rubber (EPDM), and chlorinated polyethylene (CPE).

In addition, the compositions according to the invention may further contain common additives known in the art, such as fillers processing aids, flame retardants, stabilizers, lubricants, and the like, in mounts that are known to those skilled in the art.

The comonomers (a), (b) and (c) can be present in the copolymer either as comonomers of the acrylic acid ester in the grafting base and/or cografted as comonomers of vinyl chloride. According to the invention, it is also possible to use, for example graft copolymers in which these comonomers have been incorporated into the graft copolymer as a second graft phase, for example in an intermediate or subsequent grafting step.

The graft copolymer according to the invention can be prepared by processes known in the art. These processes can be carried out as a solution, suspension or emulsion polymerization, preferably in an aqueous medium.

In a preferred process, the graft copolymer according to the invention is prepared by first grafting the vinyl chloride onto the acrylic acid ester polymer. This graft product is combined then with option other additives and thereafter fiuxed prior to the addition of component (c). Following the addition of component (c) the grafted copolymer can be pressed or moulded into a desired end product shape, such as a self-supporting film or a molded article.

EXAMPLES

Graft copolymer compositions according to the invention can be prepared on a mill by fiuxing the vinyl chloride grafted polymer and other formulation additives prior to the addition of EnBACO, to ensure a complete gelification of the vinyl chloride grafted polymer.

Granules of EnBACO are added to the fixed vinyl chloride grafted polymer. If the EnBACO content is below 50 parts per hundred (pph), the EnBACO can be added at once; if the EnBACO content is higher, it should be added in two steps. The composition is then mixed until a smooth and homogeneous sheet is produced. The sheet is removed and pressed into plaques.

Typical process conditions are as follows.

Mill: Shaw 15×30 cm; oil heated (friction ratio 1:1.14)

Mill temperature: 180° C.

Mixing time to form sheet: 3 min.

0.2×150×150 mm plaques formed at 180° C.

In Table I, below, the terms and abbreviations have the following meanings:

VC/PAE I: vinyl chloride-polybutyl acrylate graft copolymer containing, by weight, 60% vinyl chloride grafted onto 40% partially cross-linked polybutyl acrylate VC/PAE II: vinyl chloride-polybutyl acrylate graft copolymer containing, by weight, 50% vinyl chloride grafted onto 50% partially cross-linked polybutyl acrylate ELVALOY 742: ethylene-vinyl acetate-carbon monoxide (EVACO) terpolymer, available from the DuPont Company ELVALOY EP 4015: EnBACO, available from the DuPont Company IRGASTAB 17 MOK: sulfur tin stabilizer, available from Ciba Corporation IRGASTAB BZ 562: barium-zinc stabilizer, available from Ciba Corporation Wachs E: lubricant of montan ester wax, available from Hoechst AC 617: polyethylene wax

TABLE I

| Compound | Control 1 | Control 2 | Example 1 |
|---|---|---|---|
| VC/PAE I | 77 | — | — |
| VC/PAE II | | 77 | 77 |
| ELVALOY 742 | 23 | 23 | — |
| ELVALOY EP 4015B | — | — | 23 |
| IRGASTAB 17 MOK | 1.3 | — | — |
| IRGASTAB BZ 562 | — | 1.3 | 1.3 |
| Wachs E | 1 | — | — |
| AC 617 | — | 1 | 1 |

TABLE II

| Test method | DIN | Properties Unit | Value Ctrl 1 | Ctrl 2 | Ex 1 |
|---|---|---|---|---|---|
| Hardness | 53505 | Shore A | 80 | 59 | 60 |
| | | Shore D | 28 | — | — |
| Tensile test | 53455 | | | | |
| Tensile strength | | | | | |
| at 23° C. | | $N/mm^2$ | 17.5 | 11.4 | 12.4 |
| at 80° C. | | | 1.3 | 1 | 0.9 |
| Elongation at break | | | | | |
| at 23° C. | | % | 250 | 353 | 383 |
| at 80° C. | | | 130 | 185 | 183 |
| Tear resistance (Graves angle test) | 53515 | $N/mm^2$ | 28.5 | 16.2 | 17 |

I claim:

1. A thermoplastic copolymer comprising
(a) an acrylic acid ester polymer;
(b) vinyl chloride; and
(c) a copolymer consisting essentially of, by weight,
(i) 40–40% ethylene;
(ii) 3–30% carbon monoxide; and
(iii) 5–60% of n-butyl acrylate.

2. A blend according to claim 1 wherein (a) is polybutyl acrylate.

3. A blend according to claim 1 comprising, by weight, 20–60% (a), 30–70% (b) and 1–30% (c).

4. A thermoplastic composition comprising a blend according to claim 1 and an additional thermoplastic material.

5. A self-supporting film made from a blend or composition according to any one of claims 1 to 4.

6. A molded article made from a blend or composition according to any one of claims 1 to 4.

* * * * *